(12) United States Patent
Binder et al.

(10) Patent No.: US 12,316,158 B2
(45) Date of Patent: May 27, 2025

(54) DUAL USE PHOTOVOLTAIC SYSTEM

(71) Applicant: Solaredge Technologies Ltd., Herzeliya (IL)

(72) Inventors: Yaron Binder, Shoham (IL); Guy Sella, Bitan Aharon (IL); Meir Adest, Modiin (IL); Lior Handelsman, Givatayim (IL); Yoav Galin, Raanana (IL); Amir Fishelov, Tel Aviv (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/343,146

(22) Filed: Jun. 28, 2023

(65) Prior Publication Data

US 2023/0344265 A1 Oct. 26, 2023

Related U.S. Application Data

(63) Continuation of application No. 17/337,079, filed on Jun. 2, 2021, now Pat. No. 11,735,951, which is a
(Continued)

(51) Int. Cl.
*H02J 7/35* (2006.01)
*H02J 3/38* (2006.01)
(Continued)

(52) U.S. Cl.
CPC ............ *H02J 7/35* (2013.01); *H02J 3/38* (2013.01); *H02J 3/381* (2013.01); *H02J 3/46* (2013.01);
(Continued)

(58) Field of Classification Search
CPC ...... H02J 3/38; H02J 3/381; H02J 3/46; H02J 3/383; H02J 7/00; H02J 9/061; H02J 3/32;
(Continued)

(56) References Cited

U.S. PATENT DOCUMENTS 2,758,219 A 8/1956 Miller
3,369,210 A 2/1968 Manickella
(Continued)

FOREIGN PATENT DOCUMENTS

CN 1309451 A 8/2001
CN 1122905 C 10/2003
(Continued)

OTHER PUBLICATIONS

QT Technical Application Papers, "ABB Circuit-Breakers for Direct current Applications", ABB SACE S.p.A., An ABB Group Company, L.V. Breakers, Via Baioni, 35, 24123 Bergamo-Italy, Tel.: +39 035.395.111—Telefax: +39 035.395.306-433, Sep. 2007.
(Continued)

*Primary Examiner* — Carlos Amaya
(74) *Attorney, Agent, or Firm* — Banner & Witcoff, Ltd.

(57) ABSTRACT

A system for providing power from a direct current (DC) source and/or alternative current (AC) source to a battery is described. The system may include DC power source terminals configured to connect to a DC power source, AC power source terminals configured to connect to an AC power source, a DC-DC converter configured to charge a battery from the DC power source terminals, an AC-DC converter configured to charge the battery from the AC power source terminals, a first switch connected between the AC power source terminals and the AC-DC converter, a second switch connected between the DC power source terminals and the DC-DC converter, and a controller configured to connect the battery to the DC power source terminals based on an absence of the AC power source, and connect the battery to the AC power source terminals based on an availability of the AC power source.

21 Claims, 5 Drawing Sheets

Related U.S. Application Data continuation of application No. 16/296,569, filed on Mar. 8, 2019, now Pat. No. 11,056,889, which is a continuation of application No. 15/014,505, filed on Feb. 3, 2016, now Pat. No. 10,270,255, which is a continuation of application No. 14/187,756, filed on Feb. 24, 2014, now Pat. No. 9,276,410, which is a continuation of application No. 12/957,490, filed on Dec. 1, 2010, now Pat. No. 8,710,699.

(60) Provisional application No. 61/265,734, filed on Dec. 1, 2009.

(51) Int. Cl.
| | |
|---|---|
| *H02J 3/46* | (2006.01) |
| *H02J 7/00* | (2006.01) |
| *H02J 9/06* | (2006.01) |
| *H02M 7/44* | (2006.01) |

(52) U.S. Cl.
CPC ............... *H02J 7/00* (2013.01); *H02J 9/061* (2013.01); *H02M 7/44* (2013.01); *H02J 2300/24* (2020.01); *H02J 2300/26* (2020.01); *Y02E 10/56* (2013.01)

(58) Field of Classification Search
CPC ...... H02J 7/345; H02J 7/34; H02J 7/35; H02J 2300/22; H02J 2300/26; H02J 2300/24; H02M 7/44; Y02E 10/56
See application file for complete search history.

(56) References Cited

U.S. PATENT DOCUMENTS

| | | |
|---|---|---|
| 3,596,229 A | 7/1971 | Hohorst |
| 3,958,136 A | 5/1976 | Schroeder |
| 4,060,757 A | 11/1977 | McMurray |
| 4,101,816 A | 7/1978 | Shepter |
| 4,146,785 A | 3/1979 | Neale |
| 4,161,771 A | 7/1979 | Bates |
| 4,171,861 A | 10/1979 | Hohorst |
| 4,257,087 A | 3/1981 | Cuk |
| 4,296,461 A | 10/1981 | Mallory et al. |
| 4,346,341 A | 8/1982 | Blackburn et al. |
| 4,452,867 A | 6/1984 | Conforti |
| 4,460,232 A | 7/1984 | Sotolongo |
| 4,481,654 A | 11/1984 | Daniels et al. |
| 4,549,254 A | 10/1985 | Kissel |
| 4,554,515 A | 11/1985 | Burson et al. |
| 4,598,330 A | 7/1986 | Woodworth |
| 4,602,322 A | 7/1986 | Merrick |
| 4,623,753 A | 11/1986 | Feldman et al. |
| 4,637,677 A | 1/1987 | Barkus |
| 4,639,844 A | 1/1987 | Gallios et al. |
| 4,641,042 A | 2/1987 | Miyazawa |
| 4,641,079 A | 2/1987 | Kato et al. |
| 4,644,458 A | 2/1987 | Harafuji et al. |
| 4,652,770 A | 3/1987 | Kumano |
| 4,685,040 A | 8/1987 | Steigerwald et al. |
| 4,686,617 A | 8/1987 | Colton |
| 4,706,181 A | 11/1987 | Mercer |
| 4,720,667 A | 1/1988 | Lee et al. |
| 4,720,668 A | 1/1988 | Lee et al. |
| 4,783,728 A | 11/1988 | Hoffman |
| RE33,057 E | 9/1989 | Clegg et al. |
| 4,864,213 A | 9/1989 | Kido |
| 4,868,379 A | 9/1989 | West |
| 4,888,063 A | 12/1989 | Powell |
| 4,888,702 A | 12/1989 | Gerken et al. |
| 4,899,269 A | 2/1990 | Rouzies |
| 4,903,851 A | 2/1990 | Slough |
| 4,906,859 A | 3/1990 | Kobayashi et al. |
| 4,910,518 A | 3/1990 | Kim et al. |
| 4,978,870 A | 12/1990 | Chen et al. |
| 4,987,360 A | 1/1991 | Thompson |
| 5,045,988 A | 9/1991 | Gritter et al. |
| 5,081,558 A | 1/1992 | Mahler |
| 5,191,519 A | 3/1993 | Kawakami |
| 5,280,232 A | 1/1994 | Kohl et al. |
| 5,287,261 A | 2/1994 | Ehsani |
| 5,289,361 A | 2/1994 | Vinciarelli |
| 5,327,071 A | 7/1994 | Frederick et al. |
| 5,345,375 A | 9/1994 | Mohan |
| 5,402,060 A | 3/1995 | Erisman |
| 5,446,645 A | 8/1995 | Shirahama et al. |
| 5,460,546 A | 10/1995 | Kunishi et al. |
| 5,493,154 A | 2/1996 | Smith et al. |
| 5,497,289 A | 3/1996 | Sugishima et al. |
| 5,517,378 A | 5/1996 | Asplund et al. |
| 5,530,335 A | 6/1996 | Decker et al. |
| 5,548,504 A | 8/1996 | Takehara |
| 5,563,780 A | 10/1996 | Goad |
| 5,604,430 A | 2/1997 | Decker et al. |
| 5,616,913 A | 4/1997 | Litterst |
| 5,644,219 A | 7/1997 | Kurokawa |
| 5,646,501 A | 7/1997 | Fishman et al. |
| 5,659,465 A | 8/1997 | Flack et al. |
| 5,686,766 A | 11/1997 | Tamechika |
| 5,773,963 A | 6/1998 | Blanc et al. |
| 5,777,515 A | 7/1998 | Kimura |
| 5,777,858 A | 7/1998 | Rodulfo |
| 5,780,092 A | 7/1998 | Agbo et al. |
| 5,798,631 A | 8/1998 | Spee et al. |
| 5,801,519 A | 9/1998 | Midya et al. |
| 5,804,894 A | 9/1998 | Leeson et al. |
| 5,821,734 A | 10/1998 | Faulk |
| 5,822,186 A | 10/1998 | Bull et al. |
| 5,838,148 A | 11/1998 | Kurokami et al. |
| 5,869,956 A | 2/1999 | Nagao et al. |
| 5,873,738 A | 2/1999 | Shimada et al. |
| 5,886,882 A | 3/1999 | Rodulfo |
| 5,886,890 A | 3/1999 | Ishida et al. |
| 5,892,354 A | 4/1999 | Nagao et al. |
| 5,905,645 A | 5/1999 | Cross |
| 5,917,722 A | 6/1999 | Singh |
| 5,919,314 A | 7/1999 | Kim |
| 5,923,158 A | 7/1999 | Kurokami et al. |
| 5,930,128 A | 7/1999 | Dent |
| 5,932,994 A | 8/1999 | Jo et al. |
| 5,933,327 A | 8/1999 | Leighton et al. |
| 5,945,806 A | 8/1999 | Faulk |
| 5,949,668 A | 9/1999 | Schweighofer |
| 5,961,739 A | 10/1999 | Osborne |
| 5,963,010 A | 10/1999 | Hayashi et al. |
| 5,990,659 A | 11/1999 | Frannhagen |
| 6,002,290 A | 12/1999 | Avery et al. |
| 6,031,736 A | 2/2000 | Takehara et al. |
| 6,037,720 A | 3/2000 | Wong et al. |
| 6,038,148 A | 3/2000 | Farrington et al. |
| 6,046,919 A | 4/2000 | Madenokouji et al. |
| 6,050,779 A | 4/2000 | Nagao et al. |
| 6,078,511 A | 6/2000 | Fasullo et al. |
| 6,081,104 A | 6/2000 | Kern |
| 6,082,122 A | 7/2000 | Madenokouji et al. |
| 6,087,738 A | 7/2000 | Hammond |
| 6,105,317 A | 8/2000 | Tomiuchi et al. |
| 6,111,188 A | 8/2000 | Kurokami et al. |
| 6,111,391 A | 8/2000 | Cullen |
| 6,111,767 A | 8/2000 | Handleman |
| 6,163,086 A | 12/2000 | Choo |
| 6,166,455 A | 12/2000 | Li |
| 6,166,527 A | 12/2000 | Dwelley et al. |
| 6,169,678 B1 | 1/2001 | Kondo et al. |
| 6,219,623 B1 | 4/2001 | Wills |
| 6,255,360 B1 | 7/2001 | Domschke et al. |
| 6,256,234 B1 | 7/2001 | Keeth et al. |
| 6,259,234 B1 | 7/2001 | Perol |
| 6,262,558 B1 | 7/2001 | Weinberg |
| 6,285,572 B1 | 9/2001 | Onizuka et al. |
| 6,292,379 B1 | 9/2001 | Edevold et al. |
| 6,301,128 B1 | 10/2001 | Jang et al. |
| 6,304,065 B1 | 10/2001 | Wittenbreder |
| 6,320,769 B2 | 11/2001 | Kurokami et al. |

(56) References Cited

U.S. PATENT DOCUMENTS

| | | |
|---|---|---|
| 6,339,538 B1 | 1/2002 | Handleman |
| 6,351,130 B1 | 2/2002 | Preiser et al. |
| 6,369,462 B1 | 4/2002 | Siri |
| 6,380,719 B2 | 4/2002 | Underwood et al. |
| 6,396,170 B1 | 5/2002 | Laufenberg et al. |
| 6,433,522 B1 | 8/2002 | Siri |
| 6,441,597 B1 | 8/2002 | Lethellier |
| 6,448,489 B2 | 9/2002 | Kimura et al. |
| 6,452,814 B1 | 9/2002 | Wittenbreder |
| 6,469,919 B1 | 10/2002 | Bennett |
| 6,483,203 B1 | 11/2002 | McCormack |
| 6,493,246 B2 | 12/2002 | Suzui et al. |
| 6,507,176 B2 | 1/2003 | Wittenbreder, Jr. |
| 6,531,848 B1 | 3/2003 | Chitsazan et al. |
| 6,545,211 B1 | 4/2003 | Mimura |
| 6,548,205 B2 | 4/2003 | Leung et al. |
| 6,587,051 B2 | 7/2003 | Takehara et al. |
| 6,590,793 B1 | 7/2003 | Nagao et al. |
| 6,593,521 B2 | 7/2003 | Kobayashi |
| 6,608,468 B2 | 8/2003 | Nagase |
| 6,611,130 B2 | 8/2003 | Chang |
| 6,611,441 B2 | 8/2003 | Kurokami et al. |
| 6,628,011 B2 | 9/2003 | Droppo et al. |
| 6,633,824 B2 | 10/2003 | Dollar, II |
| 6,650,031 B1 | 11/2003 | Goldack |
| 6,650,560 B2 | 11/2003 | MacDonald et al. |
| 6,653,549 B2 | 11/2003 | Matsushita et al. |
| 6,672,018 B2 | 1/2004 | Shingleton |
| 6,678,174 B2 | 1/2004 | Suzui et al. |
| 6,690,590 B2 | 2/2004 | Stamenic et al. |
| 6,693,781 B1 | 2/2004 | Kroker |
| 6,731,136 B2 | 5/2004 | Knee |
| 6,738,692 B2 | 5/2004 | Schienbein et al. |
| 6,744,643 B2 | 6/2004 | Luo et al. |
| 6,765,315 B2 | 7/2004 | Hammerstrom et al. |
| 6,768,047 B2 | 7/2004 | Chang et al. |
| 6,788,033 B2 | 9/2004 | Vinciarelli |
| 6,788,146 B2 | 9/2004 | Forejt et al. |
| 6,795,318 B2 | 9/2004 | Haas et al. |
| 6,801,442 B2 | 10/2004 | Suzui et al. |
| 6,810,339 B2 | 10/2004 | Wills |
| 6,850,074 B2 | 2/2005 | Adams et al. |
| 6,882,131 B1 | 4/2005 | Takada et al. |
| 6,914,418 B2 | 7/2005 | Sung |
| 6,919,714 B2 | 7/2005 | Delepaut |
| 6,927,955 B2 | 8/2005 | Suzui et al. |
| 6,933,627 B2 | 8/2005 | Wilhelm |
| 6,936,995 B2 | 8/2005 | Kapsokavathis et al. |
| 6,950,323 B2 | 9/2005 | Achleitner et al. |
| 6,963,147 B2 | 11/2005 | Kurokami et al. |
| 6,984,967 B2 | 1/2006 | Notman |
| 6,984,970 B2 | 1/2006 | Capel |
| 7,030,597 B2 | 4/2006 | Bruno et al. |
| 7,031,176 B2 | 4/2006 | Kotsopoulos et al. |
| 7,038,430 B2 | 5/2006 | Itabashi et al. |
| 7,042,195 B2 | 5/2006 | Tsunetsugu et al. |
| 7,046,531 B2 | 5/2006 | Zocchi et al. |
| 7,053,506 B2 | 5/2006 | Alonso et al. |
| 7,072,194 B2 | 7/2006 | Nayar et al. |
| 7,079,406 B2 | 7/2006 | Kurokami et al. |
| 7,087,332 B2 | 8/2006 | Harris |
| 7,090,509 B1 | 8/2006 | Gilliland et al. |
| 7,091,707 B2 | 8/2006 | Cutler |
| 7,097,516 B2 | 8/2006 | Werner et al. |
| 7,099,169 B2 | 8/2006 | West et al. |
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,148,669 B2 | 12/2006 | Maksimovic et al. |
| 7,158,359 B2 | 1/2007 | Bertele et al. |
| 7,158,395 B2 | 1/2007 | Deng et al. |
| 7,174,973 B1 | 2/2007 | Lysaght |
| 7,193,872 B2 | 3/2007 | Siri |
| 7,218,541 B2 | 5/2007 | Price et al. |
| 7,248,946 B2 | 7/2007 | Bashaw et al. |
| 7,256,566 B2 | 8/2007 | Bhavaraju et al. |
| 7,277,304 B2 | 10/2007 | Stancu et al. |
| 7,281,141 B2 | 10/2007 | Elkayam et al. |
| 7,282,814 B2 | 10/2007 | Jacobs |
| 7,291,036 B1 | 11/2007 | Daily et al. |
| RE39,976 E | 1/2008 | Schiff et al. |
| 7,336,056 B1 | 2/2008 | Dening |
| 7,348,802 B2 | 3/2008 | Kasanyal et al. |
| 7,352,154 B2 | 4/2008 | Cook |
| 7,371,963 B2 | 5/2008 | Suenaga et al. |
| 7,372,712 B2 | 5/2008 | Stancu et al. |
| 7,385,380 B2 | 6/2008 | Ishigaki et al. |
| 7,385,833 B2 | 6/2008 | Keung |
| 7,394,237 B2 | 7/2008 | Chou et al. |
| 7,420,815 B2 | 9/2008 | Love |
| 7,435,134 B2 | 10/2008 | Lenox |
| 7,435,897 B2 | 10/2008 | Russell |
| 7,443,052 B2 | 10/2008 | Wendt et al. |
| 7,456,523 B2 | 11/2008 | Kobayashi |
| 7,471,014 B2 | 12/2008 | Lum et al. |
| 7,495,419 B1 | 2/2009 | Ju |
| 7,504,811 B2 | 3/2009 | Watanabe et al. |
| 7,589,437 B2 | 9/2009 | Henne et al. |
| 7,600,349 B2 | 10/2009 | Liebendorfer |
| 7,602,080 B1 | 10/2009 | Hadar et al. |
| 7,605,498 B2 | 10/2009 | Ledenev et al. |
| 7,612,283 B2 | 11/2009 | Toyomura et al. |
| 7,646,116 B2 | 1/2010 | Batarseh et al. |
| 7,709,727 B2 | 5/2010 | Roehrig et al. |
| 7,719,140 B2 | 5/2010 | Ledenev et al. |
| 7,748,175 B2 | 7/2010 | Liebendorfer |
| 7,759,575 B2 | 7/2010 | Jones et al. |
| 7,763,807 B2 | 7/2010 | Richter |
| 7,780,472 B2 | 8/2010 | Lenox |
| 7,782,031 B2 | 8/2010 | Qiu et al. |
| 7,783,389 B2 | 8/2010 | Yamada et al. |
| 7,787,273 B2 | 8/2010 | Lu et al. |
| 7,804,282 B2 | 9/2010 | Bertele |
| 7,812,701 B2 | 10/2010 | Lee et al. |
| 7,839,022 B2 | 11/2010 | Wolfs |
| 7,843,085 B2 | 11/2010 | Ledenev et al. |
| 7,864,497 B2 | 1/2011 | Quardt et al. |
| 7,868,599 B2 | 1/2011 | Rahman et al. |
| 7,880,334 B2 | 2/2011 | Evans et al. |
| 7,893,346 B2 | 2/2011 | Nachamkin et al. |
| 7,900,361 B2 | 3/2011 | Adest et al. |
| 7,919,952 B1 | 4/2011 | Fahrenbruch |
| 7,919,953 B2 | 4/2011 | Porter et al. |
| 7,925,552 B2 | 4/2011 | Tarbell et al. |
| 7,944,191 B2 | 5/2011 | Xu |
| 7,945,413 B2 | 5/2011 | Krein |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 8,003,885 B2 | 8/2011 | Richter et al. |
| 8,004,116 B2 | 8/2011 | Ledenev et al. |
| 8,004,117 B2 | 8/2011 | Adest et al. |
| 8,013,472 B2 | 9/2011 | Adest et al. |
| 8,018,748 B2 | 9/2011 | Leonard |
| 8,058,747 B2 | 11/2011 | Avrutsky et al. |
| 8,058,752 B2 | 11/2011 | Erickson, Jr. et al. |
| 8,067,855 B2 | 11/2011 | Mumtaz et al. |
| 8,077,437 B2 | 12/2011 | Mumtaz et al. |
| 8,093,756 B2 | 1/2012 | Porter et al. |
| 8,093,757 B2 | 1/2012 | Wolfs |
| 8,098,055 B2 | 1/2012 | Avrutsky et al. |
| 8,102,144 B2 | 1/2012 | Capp et al. |
| 8,111,052 B2 | 2/2012 | Glovinsky |
| 8,116,103 B2 | 2/2012 | Zacharias et al. |
| 8,138,914 B2 | 3/2012 | Wong et al. |
| 8,184,460 B2 | 5/2012 | O'Brien et al. |
| 8,204,709 B2 | 6/2012 | Presher, Jr. et al. |
| 8,289,742 B2 | 10/2012 | Adest et al. |
| 8,415,937 B2 | 4/2013 | Hester |
| 8,436,592 B2 | 5/2013 | Saitoh |
| 8,570,017 B2 | 10/2013 | Perichon et al. |
| 2001/0023703 A1 | 9/2001 | Kondo et al. |
| 2001/0034982 A1 | 11/2001 | Nagao et al. |

(56) References Cited

U.S. PATENT DOCUMENTS

| | | |
|---|---|---|
| 2002/0044473 A1 | 4/2002 | Toyomura et al. |
| 2002/0056089 A1 | 5/2002 | Houston |
| 2003/0058593 A1 | 3/2003 | Bertele et al. |
| 2003/0058662 A1 | 3/2003 | Baudelot et al. |
| 2003/0066076 A1 | 4/2003 | Minahan |
| 2003/0075211 A1 | 4/2003 | Makita et al. |
| 2003/0080741 A1 | 5/2003 | LeRow et al. |
| 2003/0214274 A1 | 11/2003 | Lethellier |
| 2004/0004402 A1 | 1/2004 | Kippley |
| 2004/0041548 A1 | 3/2004 | Perry |
| 2004/0061527 A1 | 4/2004 | Knee |
| 2004/0125618 A1 | 7/2004 | De Rooij et al. |
| 2004/0140719 A1 | 7/2004 | Vulih et al. |
| 2004/0169499 A1 | 9/2004 | Huang et al. |
| 2004/0201279 A1 | 10/2004 | Templeton |
| 2004/0201933 A1 | 10/2004 | Blanc |
| 2004/0246226 A1 | 12/2004 | Moon |
| 2005/0002214 A1 | 1/2005 | Deng et al. |
| 2005/0005785 A1 | 1/2005 | Poss et al. |
| 2005/0017697 A1 | 1/2005 | Capel |
| 2005/0057214 A1 | 3/2005 | Matan |
| 2005/0057215 A1 | 3/2005 | Matan |
| 2005/0068820 A1 | 3/2005 | Radosevich et al. |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0121067 A1 | 6/2005 | Toyomura et al. |
| 2005/0162018 A1 | 7/2005 | Realmuto et al. |
| 2005/0172995 A1 | 8/2005 | Rohrig et al. |
| 2005/0184594 A1* | 8/2005 | Fredette .............. H02J 3/32 307/78 |
| 2005/0194937 A1 | 9/2005 | Jacobs |
| 2005/0226017 A1 | 10/2005 | Kotsopoulos et al. |
| 2005/0281064 A1 | 12/2005 | Olsen et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0053447 A1 | 3/2006 | Krzyzanowski et al. |
| 2006/0066349 A1 | 3/2006 | Murakami |
| 2006/0068239 A1 | 3/2006 | Norimatsu et al. |
| 2006/0108979 A1 | 5/2006 | Daniel et al. |
| 2006/0113843 A1 | 6/2006 | Beveridge |
| 2006/0113979 A1 | 6/2006 | Ishigaki et al. |
| 2006/0118162 A1 | 6/2006 | Saelzer et al. |
| 2006/0132102 A1 | 6/2006 | Harvey |
| 2006/0149396 A1 | 7/2006 | Templeton |
| 2006/0162772 A1 | 7/2006 | Presher et al. |
| 2006/0163946 A1 | 7/2006 | Henne et al. |
| 2006/0171182 A1 | 8/2006 | Siri et al. |
| 2006/0174939 A1 | 8/2006 | Matan |
| 2006/0176716 A1 | 8/2006 | Balakrishnan et al. |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0227578 A1 | 10/2006 | Datta et al. |
| 2006/0237058 A1 | 10/2006 | McClintock et al. |
| 2007/0013349 A1 | 1/2007 | Bassett |
| 2007/0030068 A1 | 2/2007 | Motonobu et al. |
| 2007/0044837 A1 | 3/2007 | Simburger et al. |
| 2007/0075689 A1 | 4/2007 | Kinder et al. |
| 2007/0075711 A1 | 4/2007 | Blanc et al. |
| 2007/0081364 A1 | 4/2007 | Andreycak |
| 2007/0133241 A1 | 6/2007 | Mumtaz et al. |
| 2007/0147075 A1 | 6/2007 | Bang |
| 2007/0159866 A1 | 7/2007 | Siri |
| 2007/0164612 A1 | 7/2007 | Wendt et al. |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0227574 A1 | 10/2007 | Cart |
| 2007/0236187 A1 | 10/2007 | Wai et al. |
| 2007/0247877 A1 | 10/2007 | Kwon et al. |
| 2007/0273342 A1 | 11/2007 | Kataoka et al. |
| 2007/0290636 A1 | 12/2007 | Beck et al. |
| 2008/0024098 A1 | 1/2008 | Hojo |
| 2008/0080177 A1 | 4/2008 | Chang |
| 2008/0088184 A1 | 4/2008 | Tung et al. |
| 2008/0097655 A1 | 4/2008 | Hadar et al. |
| 2008/0106250 A1 | 5/2008 | Prior et al. |
| 2008/0115823 A1 | 5/2008 | Kinsey |
| 2008/0136367 A1 | 6/2008 | Adest et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0150366 A1* | 6/2008 | Adest .............. H02J 3/381 307/77 |
| 2008/0164766 A1 | 7/2008 | Adest et al. |
| 2008/0179949 A1 | 7/2008 | Besser et al. |
| 2008/0218152 A1 | 9/2008 | Bo |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0246460 A1 | 10/2008 | Smith |
| 2008/0246463 A1 | 10/2008 | Sinton et al. |
| 2008/0252273 A1 | 10/2008 | Woo et al. |
| 2008/0303503 A1 | 12/2008 | Wolfs |
| 2009/0039852 A1 | 2/2009 | Fishelov et al. |
| 2009/0066399 A1 | 3/2009 | Chen et al. |
| 2009/0073726 A1 | 3/2009 | Babcock |
| 2009/0084570 A1 | 4/2009 | Gherardini et al. |
| 2009/0097172 A1 | 4/2009 | Bremicker et al. |
| 2009/0102440 A1 | 4/2009 | Coles |
| 2009/0121549 A1 | 5/2009 | Leonard |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0184746 A1 | 7/2009 | Fahrenbruch |
| 2009/0190275 A1 | 7/2009 | Gilmore et al. |
| 2009/0206666 A1 | 8/2009 | Sella et al. |
| 2009/0217965 A1 | 9/2009 | Dougal et al. |
| 2009/0224817 A1 | 9/2009 | Nakamura et al. |
| 2009/0237042 A1 | 9/2009 | Glovinski |
| 2009/0237043 A1 | 9/2009 | Glovinsky |
| 2009/0242011 A1 | 10/2009 | Proisy et al. |
| 2009/0273241 A1 | 11/2009 | Gazit et al. |
| 2009/0282755 A1 | 11/2009 | Abbott et al. |
| 2009/0284998 A1 | 11/2009 | Zhang et al. |
| 2009/0322494 A1 | 12/2009 | Lee |
| 2010/0001587 A1 | 1/2010 | Casey et al. |
| 2010/0052735 A1 | 3/2010 | Burkland et al. |
| 2010/0085670 A1 | 4/2010 | Palaniswami et al. |
| 2010/0124027 A1 | 5/2010 | Handelsman et al. |
| 2010/0127571 A1 | 5/2010 | Hadar et al. |
| 2010/0139743 A1 | 6/2010 | Hadar et al. |
| 2010/0176773 A1 | 7/2010 | Capel |
| 2010/0181957 A1 | 7/2010 | Goeltner |
| 2010/0214808 A1 | 8/2010 | Rodriguez |
| 2010/0244575 A1 | 9/2010 | Coccia et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0286836 A1 | 11/2010 | Shaver, II et al. |
| 2010/0294528 A1 | 11/2010 | Sella et al. |
| 2010/0294903 A1 | 11/2010 | Shmukler et al. |
| 2010/0297860 A1 | 11/2010 | Shmukler et al. |
| 2010/0301991 A1 | 12/2010 | Sella et al. |
| 2010/0308662 A1 | 12/2010 | Schatz et al. |
| 2011/0006743 A1 | 1/2011 | Fabbro |
| 2011/0037600 A1 | 2/2011 | Takehara et al. |
| 2011/0043172 A1 | 2/2011 | Dearn |
| 2011/0079263 A1 | 4/2011 | Avrutsky |
| 2011/0084553 A1 | 4/2011 | Adest et al. |
| 2011/0114154 A1 | 5/2011 | Lichy et al. |
| 2011/0115295 A1 | 5/2011 | Moon et al. |
| 2011/0121652 A1 | 5/2011 | Sella et al. |
| 2011/0125431 A1 | 5/2011 | Adest et al. |
| 2011/0133552 A1 | 6/2011 | Binder et al. |
| 2011/0139213 A1 | 6/2011 | Lee |
| 2011/0140536 A1 | 6/2011 | Adest et al. |

(56) References Cited

U.S. PATENT DOCUMENTS

| | | | |
|---|---|---|---|
| 2011/0181251 A1 | 7/2011 | Porter et al. | |
| 2011/0181340 A1 | 7/2011 | Gazit | |
| 2011/0210611 A1 | 9/2011 | Ledenev et al. | |
| 2011/0227411 A1 | 9/2011 | Arditi | |
| 2011/0254372 A1* | 10/2011 | Haines | H02J 9/062 307/66 |
| 2011/0260866 A1 | 10/2011 | Avrutsky et al. | |
| 2011/0267859 A1 | 11/2011 | Chapman | |
| 2011/0271611 A1 | 11/2011 | Maracci et al. | |
| 2011/0273015 A1 | 11/2011 | Adest et al. | |
| 2011/0273016 A1 | 11/2011 | Adest et al. | |
| 2011/0285205 A1 | 11/2011 | Ledenev et al. | |
| 2011/0290317 A1 | 12/2011 | Naumovitz et al. | |
| 2011/0291486 A1 | 12/2011 | Adest et al. | |
| 2011/0316346 A1 | 12/2011 | Porter et al. | |
| 2012/0007613 A1 | 1/2012 | Gazit | |
| 2012/0019966 A1 | 1/2012 | DeBoer | |
| 2012/0032515 A1 | 2/2012 | Ledenev et al. | |
| 2012/0048325 A1 | 3/2012 | Matsuo et al. | |
| 2012/0081009 A1 | 4/2012 | Shteynberg et al. | |
| 2012/0091810 A1 | 4/2012 | Aiello et al. | |
| 2012/0113554 A1 | 5/2012 | Paoletti et al. | |

FOREIGN PATENT DOCUMENTS

| | | | |
|---|---|---|---|
| CN | 101136129 A | 3/2008 | |
| CN | 101488271 A | 7/2009 | |
| CN | 101523230 A | 9/2009 | |
| DE | 19737286 A1 | 3/1999 | |
| DE | 102005030907 A1 | 1/2007 | |
| DE | 102008057874 A1 | 5/2010 | |
| EP | 419093 A2 | 3/1991 | |
| EP | 420295 A1 | 4/1991 | |
| EP | 604777 A1 | 7/1994 | |
| EP | 756178 A2 | 1/1997 | |
| EP | 827254 A2 | 3/1998 | |
| EP | 1039621 A2 | 9/2000 | |
| EP | 1047179 A1 | 10/2000 | |
| EP | 1330009 A2 | 7/2003 | |
| EP | 1503490 A1 | 2/2005 | |
| EP | 1531542 A2 | 5/2005 | |
| EP | 1531545 A2 | 5/2005 | |
| EP | 1657557 A1 | 5/2006 | |
| EP | 1657797 A1 | 5/2006 | |
| EP | 1887675 A2 | 2/2008 | |
| EP | 2048679 A1 | 4/2009 | |
| EP | 2315328 A2 | 4/2011 | |
| EP | 2393178 A2 | 12/2011 | |
| ES | 2249147 A1 | 3/2006 | |
| ES | 2249149 A1 | 3/2006 | |
| GB | 2476508 A | 6/2011 | |
| GB | 2480015 B | 12/2011 | |
| JP | 61065320 A | 4/1986 | |
| JP | 8009557 A | 1/1996 | |
| JP | 11041832 A | 2/1999 | |
| JP | 11103538 A | 4/1999 | |
| JP | 11206038 A | 7/1999 | |
| JP | 11289891 A | 10/1999 | |
| JP | 11318042 A | 11/1999 | |
| JP | 2000174307 A | 6/2000 | |
| JP | 2000339044 A | 12/2000 | |
| JP | 2001189476 A | 7/2001 | |
| JP | 2002300735 A | 10/2002 | |
| JP | 2003124492 A | 4/2003 | |
| JP | 2003134667 A | 5/2003 | |
| JP | 2004194500 A | 7/2004 | |
| JP | 2004260944 A | 9/2004 | |
| JP | 2004-334704 A | 11/2004 | |
| JP | 2005192314 A | 7/2005 | |
| JP | 2007058845 A | 3/2007 | |
| WO | 1993013587 A1 | 7/1993 | |
| WO | 1996013093 A1 | 5/1996 | |
| WO | 1998023021 A2 | 5/1998 | |
| WO | 00/00839 A1 | 1/2000 | |
| WO | 00/21178 A1 | 4/2000 | |
| WO | 0075947 A1 | 12/2000 | |
| WO | 0231517 | 4/2002 | |
| WO | 2003050938 A2 | 6/2003 | |
| WO | 2003071655 A1 | 8/2003 | |
| WO | 2004023278 A2 | 3/2004 | |
| WO | 2004090993 A2 | 10/2004 | |
| WO | 2004098261 A2 | 11/2004 | |
| WO | 2004107543 A2 | 12/2004 | |
| WO | 2005076444 A1 | 8/2005 | |
| WO | 2005076445 A1 | 8/2005 | |
| WO | 2006005125 A1 | 1/2006 | |
| WO | 2006007198 A1 | 1/2006 | |
| WO | 2006078685 A2 | 7/2006 | |
| WO | 2007006564 A2 | 1/2007 | |
| WO | 2007048421 A2 | 5/2007 | |
| WO | 2007073951 A1 | 7/2007 | |
| WO | 2007084196 A2 | 7/2007 | |
| WO | 2007090476 A2 | 8/2007 | |
| WO | 2007113358 A1 | 10/2007 | |
| WO | 2008008528 A2 | 1/2008 | |
| WO | 2008125915 A2 | 10/2008 | |
| WO | 2008132551 A2 | 11/2008 | |
| WO | 2008132553 A2 | 11/2008 | |
| WO | 2008142480 A2 | 11/2008 | |
| WO | 2009007782 A2 | 1/2009 | |
| WO | 2009046533 A1 | 4/2009 | |
| WO | 2009051853 A1 | 4/2009 | |
| WO | 2009073868 A1 | 6/2009 | |
| WO | 2009118682 A2 | 10/2009 | |
| WO | 2009118683 A2 | 10/2009 | |
| WO | 2009136358 A1 | 11/2009 | |
| WO | 2010/002960 A1 | 1/2010 | |
| WO | 2010065043 A1 | 6/2010 | |
| WO | 2010065388 A1 | 6/2010 | |
| WO | 2010072717 A1 | 7/2010 | |
| WO | 2010078303 A2 | 7/2010 | |
| WO | 2010094012 A1 | 8/2010 | |
| WO | 20100134057 A1 | 11/2010 | |
| WO | 2011011711 A2 | 1/2011 | |
| WO | 2011017721 A1 | 2/2011 | |
| WO | 2011023732 A2 | 3/2011 | |
| WO | 2011059067 A1 | 5/2011 | |
| WO | 2011074025 A1 | 6/2011 | |

OTHER PUBLICATIONS

Woyte, et al., "Mains Monitoring and Protection in a European Context", 17th European Photovoltaic Solar Energy Conference and Exhibition, Munich, Germany, Oct. 22-26, 2001, Achim, Woyte, et al., pp. 1-4.

"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.

Fairchild Semiconductor, Application Note 9016, IGBT Basics 1, by K.S. Oh Feb. 1, 2001.

"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.

Walker, "A DC Circuit Breaker for an Electric Vehicle Battery Pack", Australasian Universities Power Engineering Conference and IEAust Electric Energy Conference, Sep. 26-29, 1999.

Combined Search and Examination Report for GB1018872.0 dated Apr. 15, 2011, 2 pages.

International Search Report and Opinion of International Patent Application PCT/2009/051221, dated Oct. 19, 2009.

International Search Report and Opinion of International Patent Application PCT/2009/051222, dated Oct. 7, 2009.

Communication in EP07874025.5 dated Aug. 17, 2011.

IPRP for PCT/IB2008/055095 dated Jun. 8, 2010, with Written Opinion.

ISR for PCT/IB2008/055095 dated Apr. 30, 2009.

ISR for PCT/IL07/01064 dated Mar. 25, 2008.

(56) References Cited

OTHER PUBLICATIONS

IPRP for PCT/IB2007/004584 dated Jun. 10, 2009, with Written Opinion.
IPRP for PCT/IB2007/004591 dated Jul. 13, 2010, with Written Opinion.
IPRP for PCT/IB2007/004643 dated Jun. 10, 2009, with Written Opinion.
Written Opinion for PCT/IB2008/055092 submitted with IPRP dated Jun. 8, 2010.
IPRP for PCT/US2008/085754 dated Jun. 8, 2010, with Written Opinion dated Jan. 21, 2009.
IPRP for PCT/US2008/085755 dated Jun. 8, 2010, with Written Opinion dated Jan. 20, 2009.
IPRP for PCT/IB2009/051221 dated Sep. 28, 2010, with Written Opinion.
IPRP for PCT/IB2009/051222 dated Sep. 28, 2010, with Written Opinion.
IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, 2011, with Written Opinion.
ISR for PCT/IB2010/052413 dated Sep. 7, 2010.
UK Intellectual Property Office, Application No. GB1109618.7, Patents Act 1977, Examination Report Under Section 18(3), Sep. 16, 2011.
UK Intellectual Property Office, Patents Act 1977: Patents Rules Notification of Grant: Patent Serial No. GB2480015, Nov. 29, 2011.
Walker, et al. "PV String Per-Module Maximum Power Point Enabling Converters", School of Information Technology and Electrical Engineering The University of Queensland, Sep. 28, 2003.
Walker, "Cascaded DC-DC Converter Connection of Photovoltaic Modules", 33rd Annual IEEE Power Electronics Specialists Conference. PESC 2002. Conference Proceedings. CAIRNS, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.
Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.
Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.
Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.
Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.
Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.
IPRP for PCT/IL2007/001064 dated Mar. 17, 2009, with Written Opinion dated Mar. 25, 2008.
IPRP for PCT/IB2007/004586 dated Jun. 10, 2009, with Written Opinion.
Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556.

IPRP PCT/IB2007/004610—date of issue Jun. 10, 2009.
Extended European Search Report—EP12176089.6—Mailing date: Nov. 8, 2012.
Gwon-Jong Yu et al: "Maximum power point tracking with temperature compensation of photovoltaic for air conditioning system with fuzzy controller", May 13, 1996; May 13, 1996-May 17, 1996, May 13, 1996 ( May 13, 1996), pp. 1429-1432, XP010208423.
Extended European Search Report—EP12177067.1—Mailing Date: Dec. 7, 2012.
GB Combined Search and Examination Report—GB1200423.0—Mailing date: Apr. 30, 2012.
GB Combined Search and Examination Report—GB1201499.9—Mailing date: May 28, 2012.
GB Combined Search and Examination Report—GB1201506.1—Mailing date: May 22, 2012.
"Study of Energy Storage Capacitor Reduction for Single Phase PWM Rectifier", Ruxi Wang et al., Virginia Polytechnic Institute and State University, Feb. 2009.
"Multilevel Inverters: A Survey of Topologies, Controls, and Applications", José Rodríguez et al., IEEE Transactions on Industrial Electronics, vol. 49, No. 4, Aug. 2002.
Extended European Search Report—EP 08878650.4—Mailing date: Mar. 28, 2013.
Satcon Solstice—Satcon Solstice 100 KW System Solution Sheet—2010.
John Xue, "PV Module Series String Balancing Converters", University of Queensland—School of Information Technology & Electrical Engineering, Nov. 6, 2002.
Robert W. Erickson, "Future of Power Electronics for Photovoltaics", IEEE Applied Power Electronics Conference, Feb. 2009.
GB Combined Search and Examination Report—GB1203763.6—Mailing date: Jun. 25, 2012.
Mohammad Reza Amini et al., "Quasi Resonant DC Link Inverter with a Simple Auxiliary Circuit", Journal of Power Electronics, vol. 11, No. 1, Jan. 2011.
Khairy Fathy et al., "A Novel Quasi-Resonant Snubber-Assisted ZCS-PWM DC-DC Converter with High Frequency Link", Journal of Power Electronics, vol. 7, No. 2, Apr. 2007.
Cheng K.W.E., "New Generation of Switched Capacitor Converters", Department of Electrical Engineering, The Hong Kong Polytechnic University, Hung Hom, Hong Kong, Power Electronics Conference, 1998, PESC 98.
1999—Per Karlsson, "Quasi Resonant DC Link Converters—Analysis and Design for a Battery Charger Application", Universitetstryckeriet, Lund University, 1999, ISBN 91-88934-14-4; Added to Lund University Publications on Jun. 4, 2012.
Hsiao Sung-Hsin et al., "ZCS Switched-Capacitor Bidirectional Converters with Secondary Output Power Amplifier for Biomedical Applications", Power Electronics Conference (IPEC) Jun. 21, 2010.
Yuang-Shung Lee et al.,"A Novel QR ZCS Switched-Capacitor Bidirectional Converter", IEEE, 2007.
Antti Tolvanen et al., "Seminar on Solar Simulation Standards and Measurement Principles", May 9, 2006 Hawaii.
J.A. Eikelboom and M.J. Jansen, "Characterisation of PV Modules of New Generations—Results of tests and simulations", Jun. 2000.
Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.
C. Liu et al., "Advanced Algorithm for MPPT Control of Photovoltaic Systems", Canadian Solar Buildings Conference, Montreal, Aug. 20-24, 2004.
Chihchiang Hua and Chihming Shen, "Study of Maximum Power Tracking Techniques and Control of DC/DC Converters for Photovoltaic Power System", IEEE 1998.
Tore Skjellnes et al., "Load sharing for parallel inverters without communication", Nordic Workshop in Power and Industrial Electronics, Aug. 12-14, 2002.
Giorgio Spiazzi at el., "A New Family of Zero-Current-Switching Variable Frequency dc-dc Converters", IEEE 2000.
Nayar, C.V., M. Ashari and W.W.L Keerthiphala, "A Gridinteractive Photovoltaic Uninterruptible Power Supply System Using Battery Storage and a Back up Diesel Generator", IEEE Transactions on Energy Conversion, vol. 15, No. 3, Sep. 2000, pp. 348?353.

(56) References Cited

OTHER PUBLICATIONS

Ph. Strauss et al., "AC coupled PV Hybrid systems and Micro Grids-state of the art and future trends", 3rd World Conference on Photovoltaic Energy Conversion, Osaka, Japan May 11-18, 2003.
Nayar, C.V., abstract, Power Engineering Society Summer Meeting, 2000. IEEE, 2000, pp. 1280-1282 vol. 2.
D. C. Martins et al., "Analysis of Utility Interactive Photovoltaic Generation System using a Single Power Static Inverter", Asian J. Energy Environ., vol. 5, Issue 2, (2004), pp. 115-137.
Rafael C. Beltrame et al., "Decentralized Multi String PV System With Integrated ZVT Cell", Congresso Brasileiro de Automática / Sep. 12-16, 2010, Bonito-MS.
Sergio Busquets-Monge et al., "Multilevel Diode-clamped Converter for Photovoltaic Generators With Independent Voltage Control of Each Solar Array", IEEE Transactions on Industrial Electronics, vol. 55, No. 7, Jul. 2008.
Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.
Office Action—JP 2011-539491—Mailing date: Mar. 26, 2013.
Supplementary European Search Report—EP08857456—Mailing Date Dec. 6, 2013.
Extended European Search Report—EP14151651.8—Mailing date: Feb. 25, 2014.
Iyomori H et al: "Three-phase bridge power block module type auxiliary resonant AC link snubber-assisted soft switching inverter for distributed AC power supply", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 650-656, XP031895550, ISBN: 978-4-88552-196-6.
Yuqing Tang: "High Power Inverter EMI characterization and Improvement Using Auxiliary Resonant Snubber Inverter", Dec. 17, 1998 (Dec. 17, 1998), XP055055241, Blacksburg, Virginia Retrieved from the Internet: URL:http:jjscholar.lib.vt.edu/theses/available/etd-012299-165108/unrestricted/THESIS. PDF, [retrieved on Mar. 5, 2013].
Yoshida M et al: "Actual efficiency and electromagnetic noises evaluations of a single inductor resonant AC link snubber-assisted three-phase soft-switching inverter", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 721-726, XP031895560, ISBN: 978-4-88552-196-6.
Third party observation—EP07874025.5—Mailing date: Aug. 6, 2011.
Ciobotaru, et al., Control of single-stage single-phase PV inverter, Aug. 7, 2006.
International Search Report and Written Opinion for PCT/IB2007/004591 dated Jul. 5, 2010.
European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Conference, Feb. 2001, Colorado Power Electronics Center Publications.
Chen, et al., "Buck-Boost PWM Converters Having Two Independently Controlled Switches", IEEE Power Electronics Specialists Conference, Jun. 2001, Colorado Power Electronics Center Publications.
Esram, et al., "Comparison of Photovoltaic Array Maximum Power Point Tracking Techniques", IEEE Transactions on Energy Conversion, vol. 22, No. 2, Jun. 2007, pp. 439-449.
Walker, et al., "Photovoltaic DC-DC Module Integrated Converter for Novel Cascaded and Bypass Grid Connection Topologies-Design and Optimisation", 37th IEEE Power Electronics Specialists Conference, Jun. 18-22, 2006, Jeju, Korea.
Geoffrey R. Walker Affidavit re: U.S. Appl. No. 11/950,271, submitted in an IDS for U.S. Appl. No. 11/950,271 on Mar. 9, 2010.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 KW PV Façade with 100 W AC Photovoltaic Modules", 1996 IEEE, 25th PVSC, May 13-17, 1996, pp. 1235-1238, Washington, DC.
Alonso, et al., "Cascaded H-Bridge Multilevel Converter for Grid Connected Photovoltaic Generators with Independent Maximum Power Point Tracking of Each Solar Array", 2003 IEEE 34th, Annual Power Electronics Specialists Conference, Acapulco, Mexico, Jun. 15-19, 2003, pp. 731-735, vol. 2.
Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.
Alonso, "A New Distributed Converter Interface for PV Panels", 20th European Photovoltaic Solar Energy Conference, Jun. 6-10, 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
Sep. 7-9, 1999—Lindgren, "Topology for Decentralised Solar Energy Inverters with a Low Voltage AC-Bus", Chalmers University of Technology, Department of Electrical Power Engineering, EPE '99—Lausanne.
Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.
Palma, "A Modular Fuel Cell, Modular DC-DC Converter Concept for High Performance and Enhanced Reliability", IEEE 2007, pp. 2633-2638.
Sep. 16-19, 1996—Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 20th European Photovoltaic Solar Energy Conference, Jun. 6-10, 2005, Barcelona, Spain, pp. 2249-2252.
Uriarte, "Energy Integrated Management System for PV Applications", 20th European Photovoltaic Solar Energy Conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
Oct. 3-7, 1999—Matsui, et al., "A New Maximum Photovoltaic Power Tracking Control Scheme Based on Power Equilibrium at DC Link", IEEE, 1999, pp. 804-809.

(56) References Cited

OTHER PUBLICATIONS

Hou, et al., Application of Adaptive Algorithm of Solar Cell Battery Charger, Apr. 2004.

Stamenic, et al., "Maximum Power Point Tracking for Building Integrated Photovoltaic Ventilation Systems", 2000.

International Preliminary Report on Patentability for PCT/IB2008/055092 dated Jun. 8, 2010.

International Search Report for PCT/IB2008/055092 dated Sep. 8, 2009.

International Search Report and Opinion of International Patent Application WO2009136358 (PCT/IB2009/051831), dated Sep. 16, 2009.

Informal Comments to the International Search Report dated Dec. 3, 2009.

PCT/IB2010/052287 International Search Report and Written Opinion dated Sep. 2, 2010.

UK Intellectual Property office, Combined Search and Examination Report for GB1100450.4 under Sections 17 and 18(3), Jul. 14, 2011.

Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.

Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.

Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.

Sandia Report SAND96-2797 I UC-1290 Unlimited Release, Printed Dec. 1996, "Photovoltaic Power Systems and The National Electrical Code: Suggested Practices", by John Wiles, Southwest Technology Development Institute New Mexico State University Las Cruces, NM.

United Kingdom Intellectual Property Office, Combined Search and Examination Report Under Sections 17 and 18(3), GB1020862.7, dated Jun. 16, 2011.

* cited by examiner

DUAL USE PHOTOVOLTAIC SYSTEM

CROSS REFERENCE TO RELATED APPLICATIONS

This Application is a continuation of U.S. patent application Ser. No. 17/337,079, filed Jun. 2, 2021, which is a continuation of U.S. patent application Ser. No. 16/296,569, filed Mar. 8, 2019, now U.S. Pat. No. 11,056,889, which is a continuation of U.S. patent application Ser. No. 15/014,505, filed on Feb. 3, 2016, now U.S. Pat. No. 10,270,255, which is a continuation of U.S. patent application Ser. No. 14/187,756, filed on Feb. 24, 2014, now U.S. Pat. No. 9,276,410, which is a continuation of U.S. patent application Ser. No. 12/957,490, filed on Dec. 1, 2010, now U.S. Pat. No. 8,710,699, which claims the benefit of and priority to U.S. Provisional Patent Application No. 61/265,734, which was filed on Dec. 1, 2009. The disclosures of each of these applications are incorporated herein by reference.

BACKGROUND

1. Technical Field

The present invention relates to a hybrid photovoltaic system which features both power grid tied operation and battery charging operation.

2. Description of Related Art

Utility networks provide an electrical power system to utility customers. The distribution of electric power from utility companies to customers utilizes a network of utility lines connected in a grid-like fashion, referred to as an power grid. The power grid may consist of many independent energy sources energizing the grid in addition to utility companies energizing the grid, with each independent energy source being referred to as a distributed power (DP) generation system. The modem utility network includes the utility power source, consumer loads, and the distributed power generation systems which also supply electrical power to the network. The number and types of distributed power generation systems is growing rapidly and can include photovoltaics, wind, hydro, fuel cells, storage systems such as battery, super-conducting flywheel, and capacitor types, and mechanical devices including conventional and variable speed diesel engines, Stirling engines, gas turbines, and microturbines. These distributed power generation systems are typically connected to the utility network such that they operate in parallel with the utility power sources.

The term "DC source" as used herein refers to and includes DC available from photovoltaics cells, wind powered DC generators, hydro powered turbines, fuel cells, storage systems such as battery, super-conducting flywheel, and capacitor types, and mechanical devices including conventional and variable speed diesel engines, stirling engines, gas turbines, and micro-turbines.

BRIEF SUMMARY

According to an embodiment of the present invention there is provided a system for providing power from a direct current (DC) source to the power grid. The system includes a first inverter with an input and an output. The input is adapted to connect to the DC source. A first switch is disposed between the output and the power grid. A second inverter has a DC terminal and an alternating current (AC) terminal. The AC terminal is adapted to connect in parallel with the output of the first inverter. A battery is adapted to connect to the DC terminal of the second inverter. A second switch connects between the DC terminal of the second inverter and the input of the first inverter. The second switch also connects the DC source to the battery. The system may further include a charging circuit adapted to be disposed between the input and the DC terminal. A load connects to the output.

According to an embodiment of the present invention there is provided a method featuring both grid tied operation and battery charging operation, the method using a hybrid photovoltaic system. Two inverters are used during off grid operation of the hybrid photovoltaic system. The hybrid photovoltaic system includes the first inverter with an input and an output. A direct current (DC) source is connected to the input. A first switch is disposed between the output and the power grid. A second inverter has a DC terminal and an AC terminal. The AC terminal is connected in parallel with the output of the first inverter. A battery connects to the DC terminal. A second switch is disposed between the DC terminal and the input. The method senses absence of the power grid. Upon sensing the absence of the power grid, the power grid is disconnected from the output and the AC terminal with the first switch. The DC source is connected to the DC terminal with the second switch, thereby shunting the input of the first inverter with the DC terminal of the second inverter. Power on the DC terminal of the second inverter may typically be converted to an output power on the AC terminal of the second inverter. The output power typically provides a local grid to the load and the output of the first inverter. Voltage of the input of the first inverter may be controlled to a voltage value based on the local grid and/or the output power provided by the second inverter. Connection to the DC terminal with the second switch may be disconnected when a difference between voltage of the input and the voltage value exceeds a predetermined value. Connection to the DC terminal with the second switch typically allows the DC source to charge the battery. The control of voltage of the input of the first inverter may be performed by the first inverter. The control of voltage of the input of the first inverter may be by adjusting a parameter of the local grid. The local grid parameter may be adjusted by the second inverter. The parameter may be a frequency, a phase angle, a voltage or a current. The control of voltage of the input of the first inverter may alternatively be performed by a circuit connected in series between the second switch and the DC terminal of the second inverter.

During on grid operation the method senses presence of the power grid. Based on the presence of the grid the DC source is disconnected from the DC terminal of the second inverter with the second switch, when the power grid is present. The output and the AC terminal are connected to the power grid with the first switch. Power on the input of the first inverter is typically converted to an output power on the output of the first inverter. The output power preferably supplies the power grid and/or a load. Power on the AC terminal of the second inverter is typically converted to a power on the DC terminal of the second inverter. The power on the DC terminal preferably charges the battery.

According to an embodiment of the present invention there is provided a power system which includes a power inverter, a backup inverter and a direct current (DC) source. The power inverter and the backup inverter are interconnected at respective outputs. A switch may be adapted to interconnect the inputs of the power inverter and the backup inverter and to connect the inputs to the DC source when a power grid is not available. When the power grid is available the switch may be adapted to disconnect the input of the backup inverter from the DC source.

The power system may further include a second switch adapted to connect the outputs of the power inverter and the backup inverter to the power grid when the power grid is available. When the power grid is not available the second switch adapted to disconnect the outputs of the backup inverter and the power inverter from the power grid. A charging circuit is typically adapted to be disposed between the DC source and the input of the backup inverter. A battery may be connected in parallel at the input of the backup inverter.

These, additional, and/or other aspects and/or advantages of the present invention are set 10 forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

Figure 1A:
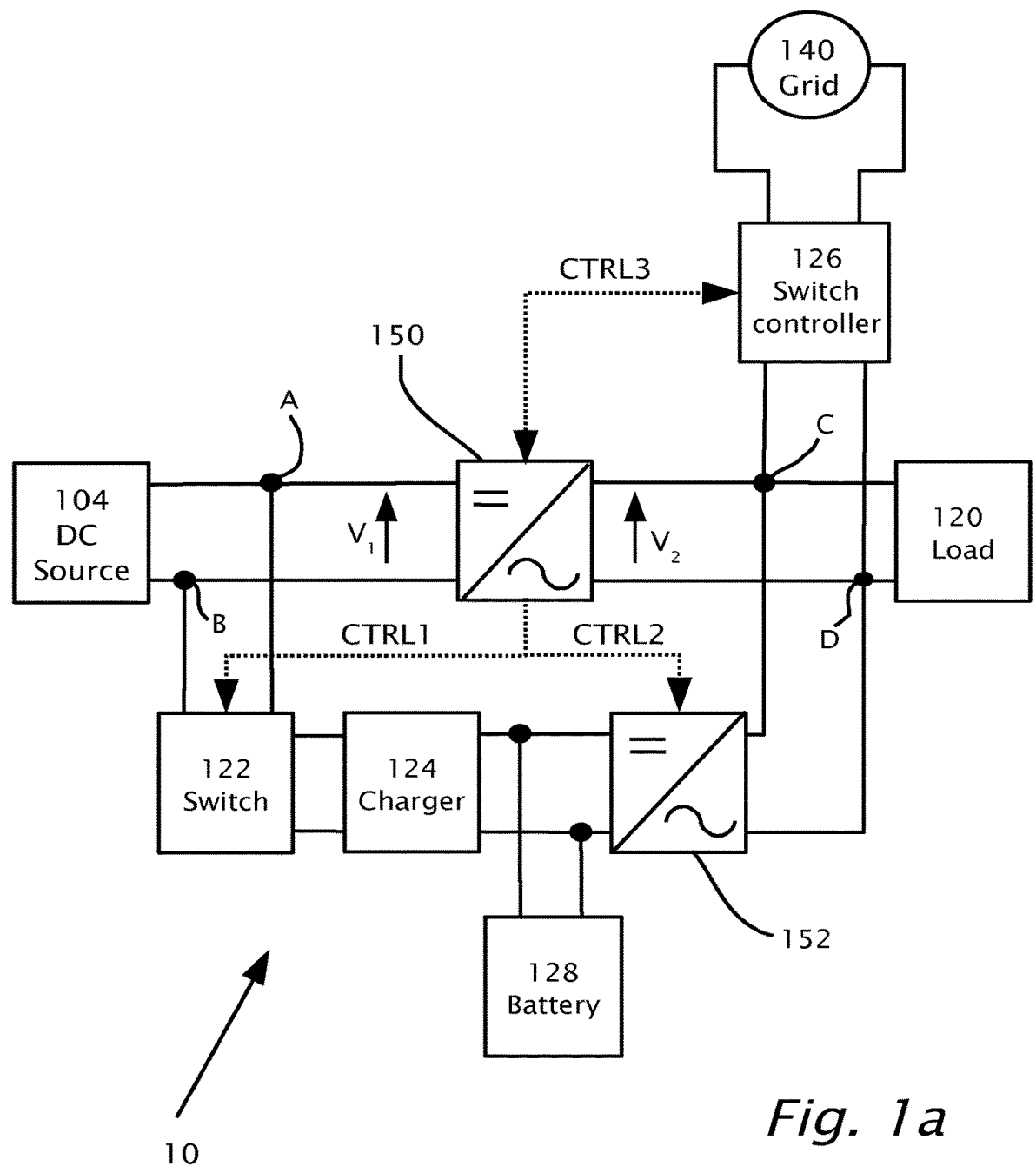
FIG. 1a shows a hybrid photovoltaic system according to an embodiment of the present invention.

The foregoing and/or other aspects will become apparent from the following detailed description when considered in conjunction with the accompanying drawing figures.

DETAILED DESCRIPTION

Reference will now be made in detail to aspects of the present invention, examples of which are illustrated in the accompanying drawings, wherein like reference numerals refer to the like elements throughout. The aspects are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, aspects of the present invention are directed primarily towards off grid operation of a hybrid photovoltaic system and possible benefits of using a lower power rated and cheaper standard backup inverter to provide a local grid. The local grid may additionally be used to derive additional circuit control function benefits from an offline main grid tied inverter which is typically higher power rated, more expensive and provides more functionality.

The term "hybrid" as used herein refers off-grid and/or on grid operation of a photovoltaic system. Equivalently, the term "hybrid" as used herein may refer to a photovoltaic system which is both/either grid connected or battery connected. Operation of a "hybrid photovoltaic system" may typically include supplying AC power to a power grid and/or load and/or DC power to the battery. AC power present on the power grid, leads to an "on grid" operation of the hybrid photovoltaic system. Otherwise the absence of AC power on the power grid leads 5 to an "off grid" operation of the hybrid photovoltaic system. Another operating factor may include nighttime or daytime operation of the hybrid photovoltaic system in either off grid or on grid operation. Also consideration of whether or not the photovoltaic array is illuminated or not or illuminated to a sufficient level leads to the load and/or power grid being supplied by a number of combinations. The number of combinations for example may be to supply the load solely from the photovoltaic array, the photovoltaic array and power grid, the power grid alone, solely from the battery, the photovoltaic array and the battery or the photovoltaic array and the battery and the power grid.

Referring now to the drawings, reference is now made to FIG 1a which shows a hybrid photovoltaic system 10 according to an embodiment of the present invention. System 10 typically includes a direct current (DC) source 104, grid tied inverter 150, load 120, grid switch controller 126, backup switch 122, charger 124, battery 128 and backup inverter 152. DC source 104 may typically be a bank of interconnected batteries, photovoltaic arrays, DC generator or DC producing fuel cells. DC source is connected at nodes A and B to an input of grid tied inverter 150. Grid tied inverter 150 typically may be rated to perform a conversion of 10000 watts of DC power provided by DC source 104 to substantially 10000 watts of alternating current (AC) power on the output of inverter 150 at nodes C and D. The conversion typically involves a maximum power point tracking (MPPT) algorithm utilized by inverter 150 such that inverter 150 sets the input voltage ($V_1$) to inverter 150.

Output of inverter 150 at nodes C and D is connected to the input of grid switch controller 126, load 120 and the alternating current (AC) side of backup inverter 152. Backup inverter 152 is typically rated at 1000 watts. Load 120 typically is an AC supply to a domestic residence. The domestic supply receives the AC supply from power grid 140 and/or AC voltage ($V_2$) provided by inverter 150. Grid switch controller 126 typically senses the presence or absence of power grid 140 to provide a status of grid 140. The status of grid 140 is typically conveyed to grid tied inverter 150 using bi-directional control line CTRL3. Grid switch controller 126 typically connects and reconnects grid 140 to nodes C and D. Grid switch controller 126 typically includes a double pole switch which connects and reconnects grid 140 to nodes C and D.

An input to backup switch 122 connects at nodes A and B. The output of switch 122 connects to the input of charging circuit 124. Backup switch 122 typically connects and reconnects the output of DC supply 104 to the input of charging circuit 124. Charging circuit 124 typically may be a DC to DC converter or a typically charge circuit which uses a linear regulator. According to one aspect of the present invention, charging circuit 124 may not be required and backup switch 122 typically connects and reconnects the output of DC supply 104 to the input of backup inverter 152.

Placed in parallel across the input of backup inverter 152 is a battery 128. Backup inverter 152 typically operates in a bi-directional mode of power conversion. The bi-directional mode of inverter 152 converts AC power to DC power and vice versa. When grid 140 is not present (i.e. off grid operation), DC power from DC source 104 and/or battery 128 is converted to AC power on nodes C and D. When grid 140 is present (i.e. on grid operation), backup inverter 152 converts AC power from grid 140 and/or AC power from grid tied inverter 150 to a DC power which charges battery 128. The DC power which charges battery 128 in on grid mode, is typically applied with the input of charging circuit isolated from DC source 104 via backup switch 122. The direction of power conversion of backup inverter 152 is from a control signal applied to control line CTRL2 from inverter 150. The operation of backup switch 122 is from a control signal applied to control line CTRL1 from inverter 150. Control signals between grid switch controller 126, grid tied inverter 150, backup switch 122 and backup inverter 152 may be wireless or by power line communications.

Figure 1B:
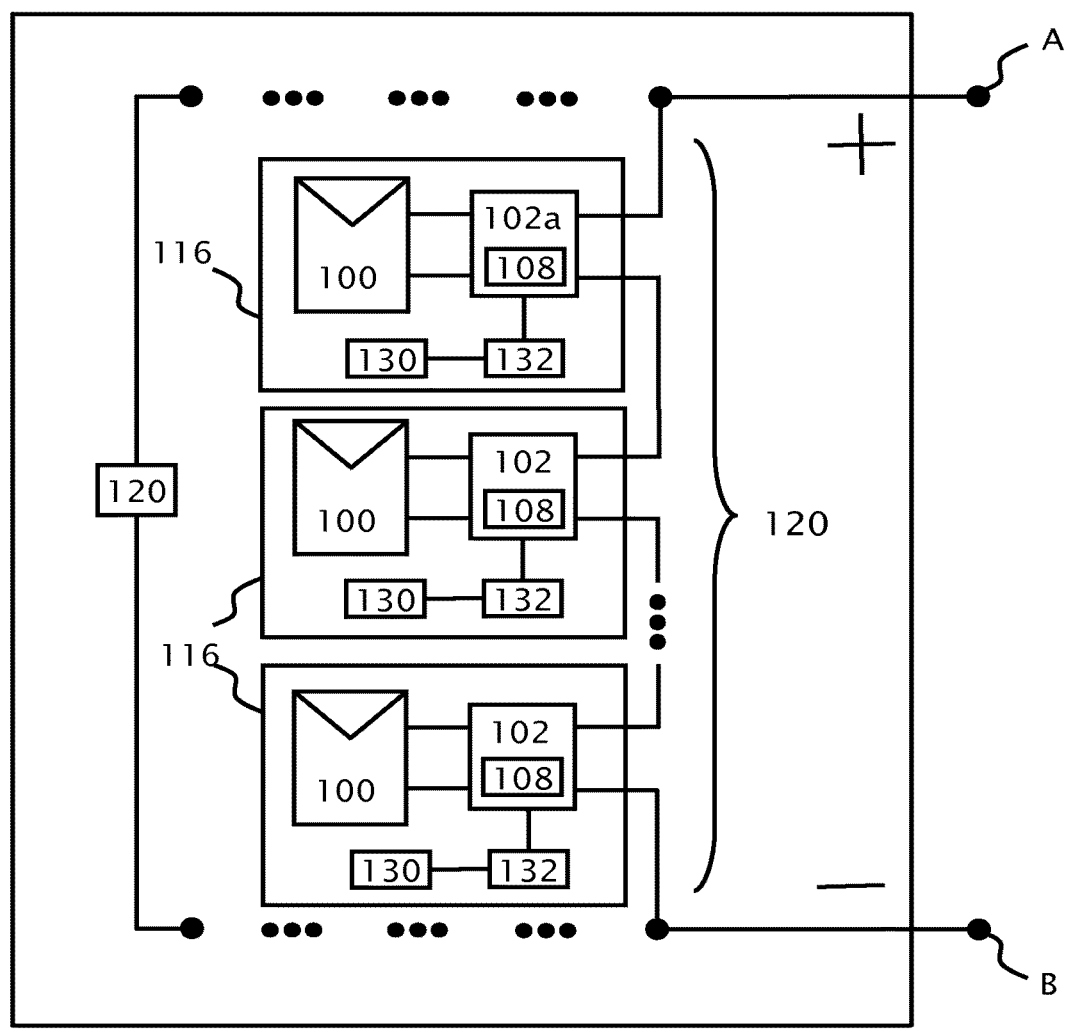
FIG. 1b shows further details of a DC supply according to an exemplary embodiment of the present invention.

Reference is now made to FIG. 1b which shows further details of DC supply 104 according to an exemplary embodiment of the present invention. DC power is supplied by DC source 104 at positive and negative nodes A and B respectively, by parallel connected photovoltaic strings 120. Details of only one of strings 120 are shown explicitly. In each of strings 120, direct current power sources 116 are serially connected. Each direct current power source 116 includes a photovoltaic panel 101 connected to an electronic module or photovoltaic module 102. Outputs of photovoltaic modules 102 are connected in series to form serial string 120. Photovoltaic modules 102 may be direct current (DC) to DC converters such as a buck circuit, boost circuit or buck-boost circuit. Attached to photovoltaic modules 102 is a processor 132 which accesses a memory 130. A transceiver 108 is attached to the output of electronic module 102 and to processor 132. According to a feature of the present invention, one of photovoltaic modules 102 referenced 102a is a master electronic module 102a of string 120 and controls and communicates with the other modules, i.e. slave modules 102 via power line communications or wireless link. According to this exemplary use of DC source 104, control of input voltage $V_1$ may be an independent control such that inverter 150 sets the input voltage ($V_1$) to inverter 150 and/or that inverter 150 instructs (via power line communication) DC-DC converters 102 to set the input voltage ($V_1$) to inverter 150.

Figure 2A:
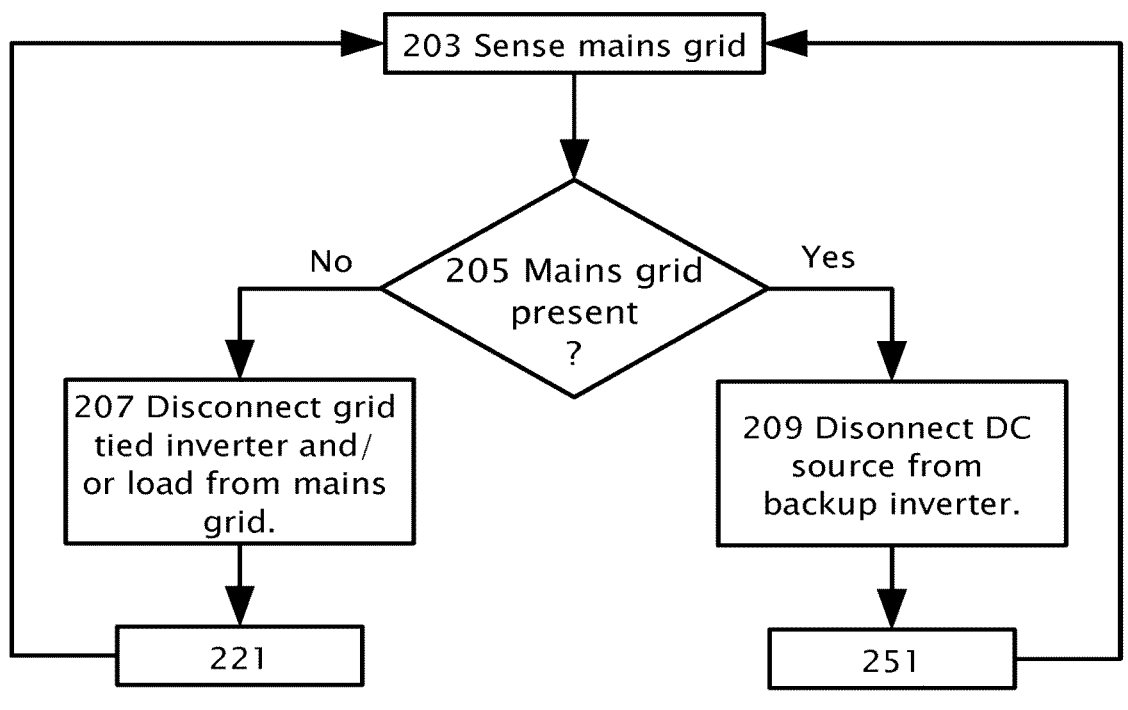
FIG. 2a shows a method for performing off grid or on grid operation of the hybrid photovoltaic system shown in FIGS. 1a and 1b, according to an embodiment of the present invention.

Reference is now made to FIG. 2a which shows a method 201 according to an embodiment of the present invention. Method 201 performs off grid or on grid operation of hybrid photovoltaic system 10 shown in FIGS. 1a and 1b. During off grid operation, DC source 104 typically supplies battery 128 and/or load 120 using backup inverter 152. During on grid operation, DC source 104 typically supplies power grid 140 and/or load 120 using grid tied inverter 150 and with battery 128 being charged using backup inverter 152.

Typically grid switch controller 126 senses the presence or absence of power grid 140 in step 203. In decision 205, if power grid 140 absent, connection to grid 140 to nodes C and D is disconnected using switch controller 126 (step 207). Grid switch controller 126 typically isolates both live and neutral of power grid 140 from nodes C and D using a double pole single throw switch. Once grid 140 is disconnected in step 207, off grid operation of system 10 continues by use of method 221 applied to system 10.

In decision 205, if power grid 140 is present, connection to grid 140 at nodes C and D using switch controller 126 typically disconnects DC source 104 from the input of backup inverter 152 and/or charge circuit 124 (step 209). With DC source 104 disconnected from the input of backup inverter 152 and/or charge circuit 124 on grid operation of system 10 continues by use of method 251 applied to system 10.

Figure 2B:
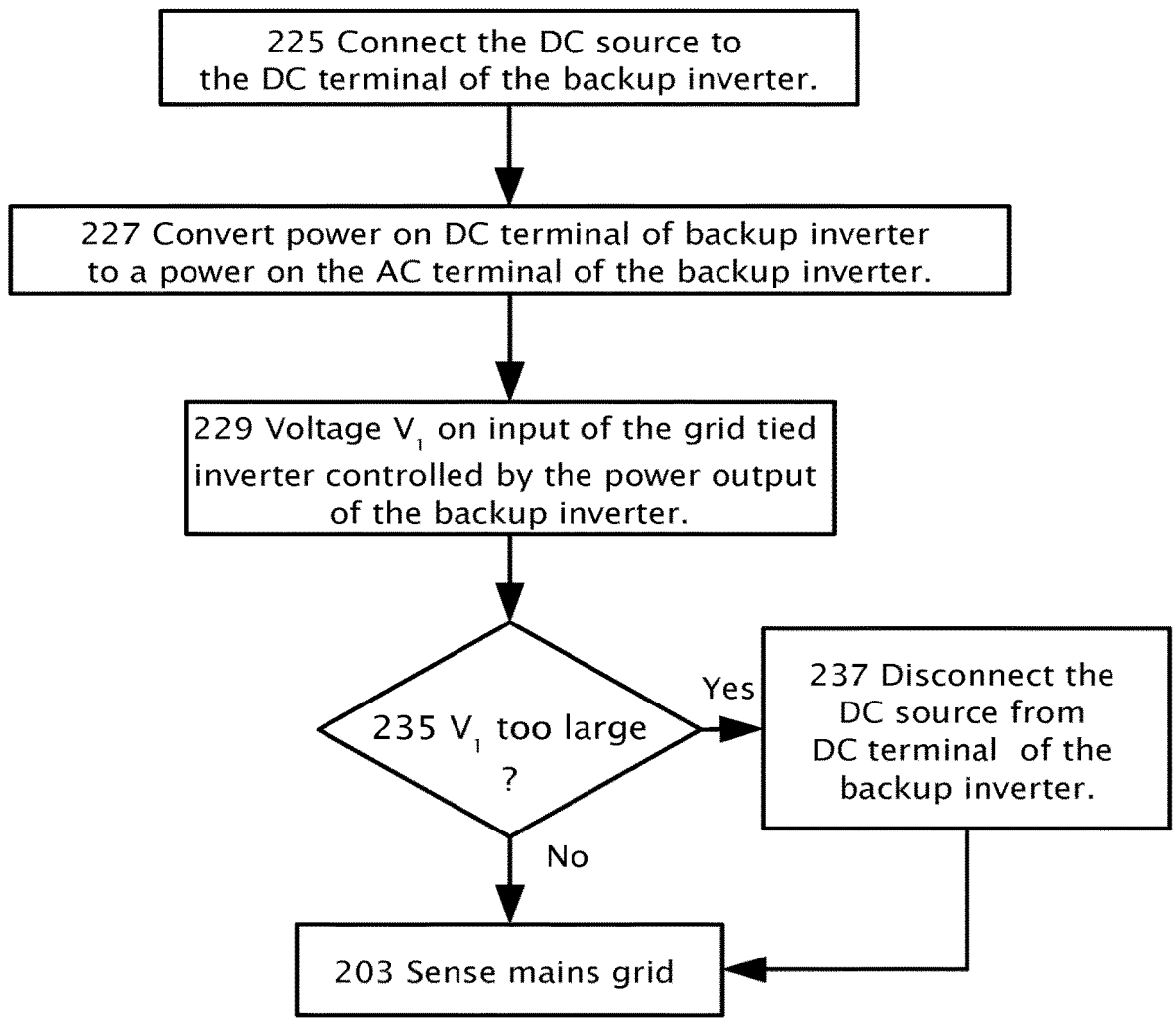
FIG. 2b shows more detailed method steps for off grid operation shown in FIG. 2a, according to an embodiment of the present invention.

Reference is now made to FIG. 2b which shows method 221 in greater detail, according to an embodiment of the present invention. With connection to grid 140 disconnected using switch controller 126 in step 207, DC source 104 is connected (step 225) to the input of charger circuit 124. According to one aspect of the present invention, charging circuit 124 may not be required and backup switch 122 typically connects the output of DC supply 104 to the input or DC terminal of backup inverter 152. DC power from the output of charger circuit 124 or DC source 104 on the input of backup inverter 152, is then converted to an AC voltage ($V_2$) power on the output or AC terminal of backup inverter 152 (step 227). The AC voltage ($V_2$) power now serves as a local grid. The local grid may be sensed by grid tied inverter 150 on the AC side of grid tied inverter 150. Typically, the frequency of the local grid may be made to vary by backup inverter 152 as an indication to grid tied inverter 150 of loading on backup inverter 152. The frequency of the local grid may be made to vary in a range from 49 hertz to 51 hertz in increments of 0.1 hertz. Alternatively the phase angle, current or voltage of the local grid may be made to vary by backup inverter 152 as an indication to grid tied inverter 150 of loading on backup inverter 152. Loading on backup inverter 152 may be dependent on the state of charge/discharge of battery 128, power demand by load 120 and the amount of power supplied by DC source 104. The indication is typically used by grid tied inverter 150 to control a maximum level of input voltage ($V_1$) on the input of inverter 150 and the input of charger circuit 124. The level of input voltage ($V_1$) on the input of inverter 150 typically ranges from 120 volts to an upper maximum of 140 volts. In decision 235 if voltage level ($V_1$) exceeds the upper maximum of 140 volts, DC source 104 is disconnected from the input of charger 124 (step 237) using backup switch 122. Otherwise sensing presence of power grid 140 continues with step 203.

Figure 2C:
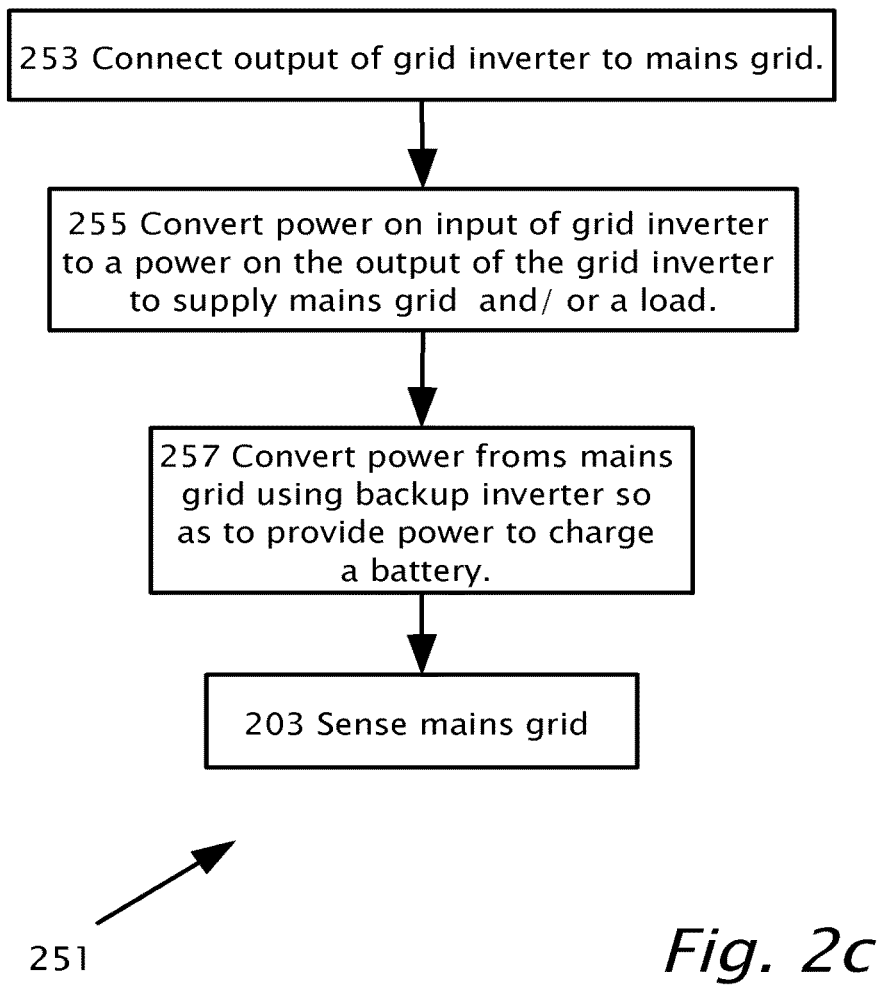
FIG. 2c more detailed method steps for on grid operation shown in FIG. 2a, according to an embodiment of the present invention.

Reference is now made to FIG. 2c which shows method 251 in greater detail according to an aspect of the present invention. With DC source 104 disconnected from the input of backup inverter 152 and/or charge circuit 124 in step 209, the output of grid tied inverter 150 at nodes C and D is connected to power grid 140 via switch controller 126. DC power on the input of grid tied inverter 150 is converted to an output AC power on nodes C and D (step 255). The output AC power supplies power 140 and/or load 120. The output AC power is additionally converted by backup inverter 152 to a DC power on the DC side of backup inverter 152 (step 257). The DC power charges battery 128 is typically controlled by back up inverter 152 and/or grid tied inverter 150. Sensing of power grid 140 continues with step 203.

By way of numerical example a DC-DC module 102 has a typical maximum output current of 16.4 A. Assuming minimum charger 124 voltage will be 120V, the total power on one string 120 is limited to 16.4A*120V≈2000 W. If more than 2000 Watts are installed on one string 120, system 10 will still work. Module 102 will be current limited and the total number of strings will not supply more than 2000 Watts during off-grid/charge mode.

By way of another numerical example, a 3240 Kilowatt PV system 10 which has 2 strings 120 of 9 modules 102, where each module 102 is rated at 180 watts. Each string 120 power will be 9*180 W=1620 W. In on grid mode, $V_1$=250-500V, total string current=6.48-12.96 A and each string 120 current=3.24-6.48 A. In on grid mode, $V_1$=120-140V, total string current=23.1-27 A and each string 120 current=11.5-13.5 A.

The term "DC source" as used herein refers to and includes DC available from photovoltaics cells, wind powered DC generators, hydro powered turbines, fuel cells, storage systems such 20 as battery, super-conducting flywheel, and capacitor types, and mechanical devices including conventional and variable speed diesel engines, Stirling engines, gas turbines, and microturbines.

The term "comprising" as used herein, refers to an open group of elements for example, comprising an element A and an element B means including one or more of element A and one or more of element B and other elements other than element A and element B may be included.

The terms "sensing" and "measuring" are used herein interchangeably.

The definite articles "a", "an" is used herein, such as "an inverter", "a switch" have the meaning of "one or more" that is "one or more inverters or "one or more switches".

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described 10 individually, it is to be understood that at least aspects of the described embodiments may be combined. Also although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. A system comprising:
   direct current (DC) power source terminals configured to connect to a DC power source;
   alternative current (AC) power source terminals configured to connect to an AC power source;
   a DC-DC converter configured to charge a battery from the DC power source terminals;
   a DC-AC converter connected directly to the DC power source terminals;
   an AC-DC converter configured to charge the battery from the AC power source terminals;
   a first switch connected between the AC power source terminals and the AC-DC converter;
   a second switch connected between the DC power source terminals and the DC-DC converter, wherein the second switch is not connected between the DC power source terminals and the DC-AC converter; and
   a controller, wherein the controller is configured to:
   connect, via the second switch and the DC-DC converter, the battery to the DC power source terminals based on an absence of power from the AC power source; and
   connect, via the first switch and the AC-DC converter, the battery to the AC power source terminals based on an availability of power from the AC power source.

2. The system of claim 1, wherein the controller is further configured to:
   disconnect, via the second switch, the battery from the DC power source terminals; or
   disconnect, via the first switch, the battery from the AC power source terminals.

3. The system of claim 1, wherein the battery comprises a charging state and a discharging state.

4. The system of claim 1, wherein the AC-DC converter is configured to output DC power for charging the battery.

5. The system of claim 1, wherein the AC-DC converter and the DC-DC converter are connected as a combined converter, and wherein the AC-DC converter is configured to charge the battery from the AC power source terminals, and the DC-DC converter is configured to charge the battery from the DC power source terminals.

6. The system of claim 5, wherein the combined converter is connected between the DC power source terminals and the AC power source terminals.

7. The system of claim 1, wherein the DC-DC converter is configured to control a voltage of the DC power source.

8. The system of claim 1, wherein the DC power source comprises a photovoltaic (PV) array, wherein the PV array comprises a plurality of DC-DC converters and a plurality of PV power sources, wherein each of the plurality of DC-DC converters is connected to a respective one of the plurality of PV power sources, and wherein a current of the DC power source is provided by the plurality of DC-DC converters.

9. The system of claim 1, wherein the battery is configured to receive power from both the AC power source terminals and the DC power source terminals based on the AC-DC converter receiving AC power from the AC power source terminals and the DC-DC converter receiving DC power from the DC power source terminals.

10. The system of claim 1, wherein the controller is configured to sense the absence of power from the AC power source or the availability of power from the AC power source.

11. A method comprising:
    connecting, via a first switch, an alternate current (AC) to direct current (DC) converter to an AC power source based on an availability of power from the AC power source, wherein the AC to DC converter is configured to charge a battery from the AC power source;
    connecting, via a second switch and a DC-DC converter, a DC power source to the battery based on an absence of power from the AC power source, wherein a DC-AC converter is directly connected between the DC power source and a load, and wherein the second switch is not connected between the DC power source and the DC-AC converter; and
    charging the battery using power from at least one of AC power source or the DC power source.

12. The method of claim 11, wherein the DC power source comprises a photovoltaic (PV) array, and the method further comprises, based on the PV array not producing power:
    converting, by the AC to DC converter, AC power received from the AC power source to DC power; and
    receiving, by the battery, the DC power.

13. The method of claim 11, further comprising:
disconnecting, via the second switch, the battery from the DC power source; or
disconnecting, via the first switch, the battery from the AC power source.

14. The method of claim 11, further comprising:
outputting, by the AC to DC converter, DC power for charging the battery.

15. The method of claim 11, wherein the AC to DC converter and the DC-DC converter are connected as a combined converter, and wherein the AC to DC converter is configured to charge the battery from the AC power source, and the DC-DC converter is configured to charge the battery from the DC power source.

16. The method of claim 15, wherein the combined converter is connected between the DC power source and the AC power source.

17. The method of claim 11, further comprising:
controlling, by the DC-DC converter, a voltage of the DC power source.

18. The method of claim 11, wherein the DC power source comprises a photovoltaic (PV) array, wherein the PV array comprises a plurality of DC-DC converters and a plurality of PV power sources, wherein each of the plurality of DC-DC converters is connected to a respective one of the plurality of PV power sources, and wherein a current of the DC power source is provided by the plurality of DC-DC converters.

19. The method of claim 11, further comprising transferring power from both the AC power source and the DC power source to the battery based on the AC to DC converter receiving AC power from the AC power source and the DC-DC converter receiving DC power from the DC power source.

20. The method of claim 11, further comprising:
sensing the absence of power from the AC power source or the availability of power from the AC power source.

21. The system of claim 1, wherein the first switch comprises a double pole and a single throw.

\* \* \* \* \*